United States Patent
Chuang

(10) Patent No.: US 9,694,615 B2
(45) Date of Patent: Jul. 4, 2017

(54) ADHESION DEVICE WITH A TEXT HIGHLIGHTING BASELINE

(71) Applicant: Hsin-Hung Chuang, Jhongli (TW)

(72) Inventor: Hsin-Hung Chuang, Jhongli (TW)

( * ) Notice: Subject to any disclaimer, the term of this patent is extended or adjusted under 35 U.S.C. 154(b) by 125 days.

(21) Appl. No.: 14/793,894

(22) Filed: Jul. 8, 2015

(65) Prior Publication Data

US 2016/0009118 A1    Jan. 14, 2016

(30) Foreign Application Priority Data

Jul. 8, 2014    (TW) .............................. 103123488 A

(51) Int. Cl.
- B42D 5/00    (2006.01)
- B32B 7/12    (2006.01)
- B32B 7/06    (2006.01)
- B32B 7/14    (2006.01)

(52) U.S. Cl.
CPC ................ B42D 5/003 (2013.01); B32B 7/06 (2013.01); B32B 7/12 (2013.01); B32B 7/14 (2013.01); *B32B 2307/412* (2013.01); *B32B 2307/414* (2013.01); *B32B 2307/748* (2013.01); *B32B 2405/00* (2013.01)

(58) Field of Classification Search
CPC ............ Y10T 428/14; Y10T 428/1467; Y10T 428/1486; B42D 9/00; B42D 9/001; B42D 9/002; B42D 9/004; B42D 5/003; B32B 2405/00; B32B 2307/412; B32B 7/06; B32B 7/12; B32B 7/14

USPC .............................. 428/40.1, 41.6, 42.1, 343
See application file for complete search history.

(56) References Cited

U.S. PATENT DOCUMENTS 3,298,850 A * 1/1967 Lythgoe .................. B41M 3/12
156/230

FOREIGN PATENT DOCUMENTS

CH    DE 102012200831 A8 * 10/2013 ............... G09F 3/10

OTHER PUBLICATIONS

Translation of DE102012200831; published Jul. 25, 2013.*

* cited by examiner

*Primary Examiner* — Catherine A Simone
(74) *Attorney, Agent, or Firm* — Muncy, Geissler, Olds & Lowe, P.C.

(57) ABSTRACT

An adhesion device with a text highlighting baseline comprises a substrate layer with a first surface and a second surface, an adhesive material layer, and a highlighting baseline layer: the adhesive material layer has one plane contacting the first surface or the second surface of the substrate layer and the other plane adhering to an object in which some text contents are included; the highlighting baseline layer designed on the first surface or the second surface of the substrate layer gets close to and highlights the text contents in an object to which the other plane of the adhesive material layer adheres.

5 Claims, 6 Drawing Sheets

ADHESION DEVICE WITH A TEXT HIGHLIGHTING BASELINE

BACKGROUND OF THE INVENTION

1. Field of the Invention

The present disclosure relates to an adhesion device, particularly an adhesion device with a text highlighting baseline.

2. Descriptions of the Related Art

To review critical texts on a book or a written document, a reader has to take a fluorescent marker pen to highlight or underscore the texts currently. A conventional method to highlight texts, however, is not ideal while contaminating a book or a written document or even degrading overall quality of the book or the written document in case of any error mark which should be covered or corrected with a correction tape (pen).

To avoid the disadvantages, a user usually tears off a single sticky note or fluorescent note available in the market, sticking the reusable note on any position as required and highlighting any text. In practice, there is one disadvantage existing in the single sticky note or fluorescent note which is torn off and stuck for highlights, that is, the conventional sticky note or fluorescent note fails to effectively highlight critical texts and is inconvenient.

Against this background, a sticky note which is competent in truly highlighting critical texts will be an optimal solution.

SUMMARY OF THE INVENTION

The present disclosure relates to an adhesion device with a text highlighting baseline which adheres to and highlights an object on which text contents are printed.

An adhesion device with a text highlighting baseline in the present disclosure comprises: a substrate layer which features light permeability and has a first surface and a second surface; an adhesive material layer which features light permeability and has two planes, one plane contacting either the first surface or the second surface of the substrate layer and the other plane adhering to an object on which text contents are printed; a highlighting baseline layer embedded between the substrate layer and the adhesive material layer and keeping a short distance from the substrate layer's edge by a margin.

In a preferred embodiment, the margin from the highlighting baseline layer to the edge of the substrate layer is less than 7 mm.

In a preferred embodiment, the highlighting baseline layer presents a solid line, a dotted line, a chain line or a wave line.

In a preferred embodiment, the highlighting baseline layer is less than 5 mm in width.

In a preferred embodiment, the substrate layer is colored and features light permeability.

An adhesion device with a text highlighting baseline, comprising: a substrate layer which features light permeability and has a first surface and a second surface; an adhesive material layer which features light permeability and has two planes, one plane contacting either the first surface or the second surface of the substrate layer and the other plane adhering to an object on which text contents are printed; a highlighting baseline layer situated at the other plane of the adhesive material layer to which no substrate layer is stuck and keeping a short distance from the substrate layer's edge by a margin.

DETAILED DESCRIPTION OF THE PREFERRED EMBODIMENTS

The embodiments and/or application methods for an adhesion device with a text highlighting baseline are disclosed hereinafter. In addition to specific components or structures disclosed in embodiments herein, other components or structures equivalent to or changed from the specific components or structures herein by the skilled person who familiarizes himself with the technical features in the present disclosure should be covered in claims of the patent specification.

The technical contents, features and effects related to an adhesion device with a text highlighting baseline are clearly presented in preferred embodiments and accompanying drawings.

Figure 1:
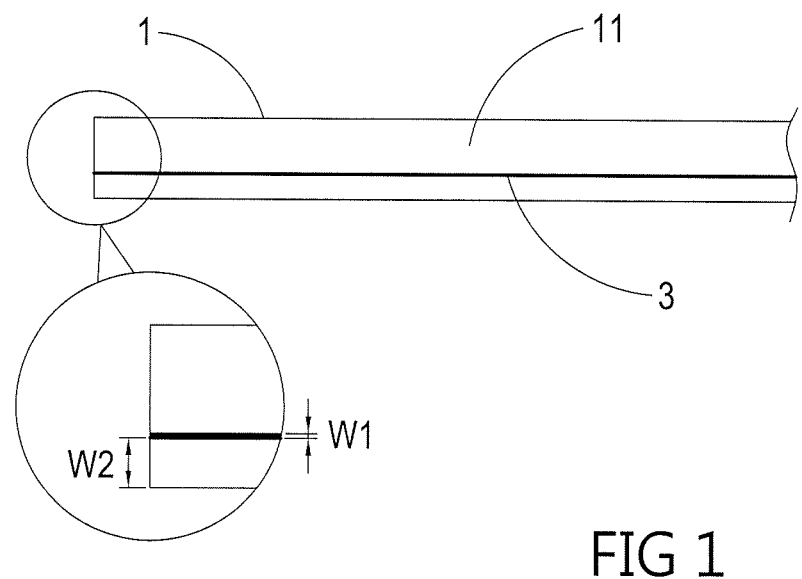
FIG. 1 is a schematic top view of an adhesion device with a text highlighting baseline.
Figure 2:
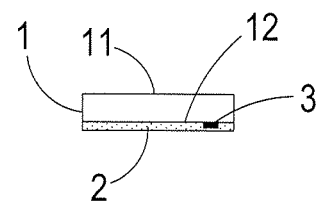
FIG. 2 is a schematic sectional view of an adhesion device with a text highlighting baseline.

Referring to FIGS. 1 and 2 which are a schematic top view and a schematic sectional view of an adhesion device with a text highlighting baseline, respectively. As shown in FIGS. 1 and 2, an adhesion device with a text highlighting baseline in the present disclosure comprises a substrate layer 1, an adhesive material layer 2 and a highlighting baseline layer 3. The substrate layer 1 which features translucency or light permeability is less than 15 mm in width and has a first surface 11 and a second surface 12. The adhesive material layer 2 which features translucency or light permeability has two planes; one plane contacts the second surface 12 of the substrate layer 1. The highlighting baseline layer 3, which is embedded between the second surface 12 of the substrate layer 1 and the adhesive material layer 2 and close to a top or bottom edge of the substrate layer 1, keeps a distance from the top edge or the bottom edge by a margin, W2, less than 7 mm and has a width, W1, less than 5 mm.

Figure 3A:
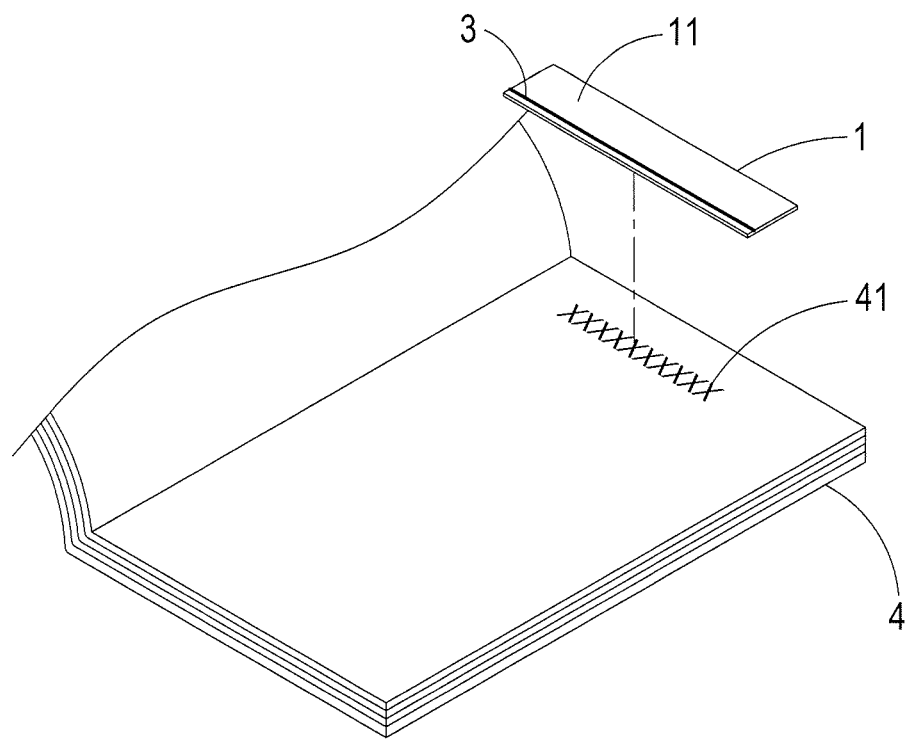
FIG. 3A is a schematic view of an adhesion device with a text highlighting baseline in an embodiment.
Figure 3B:
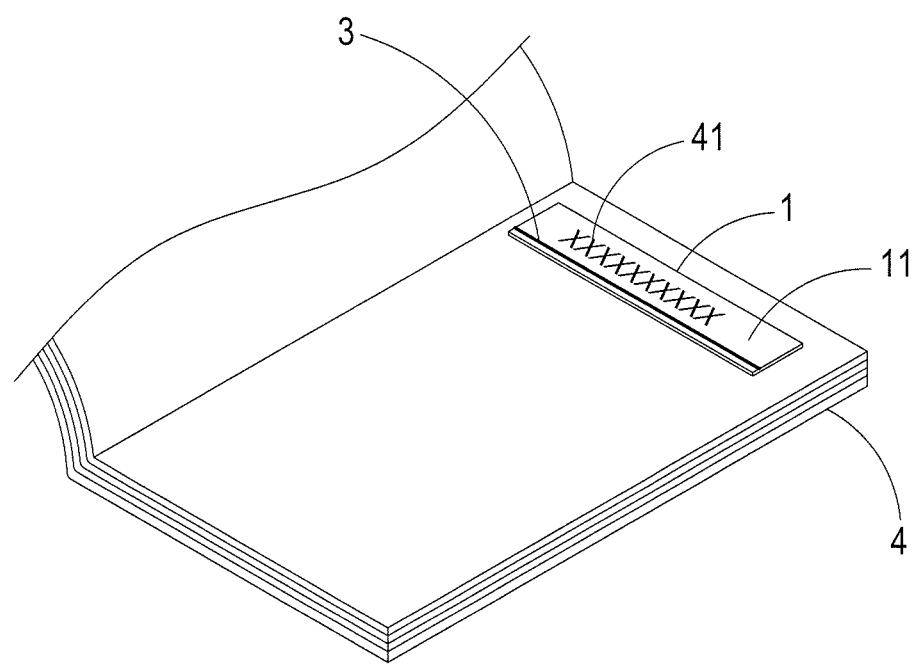
FIG. 3B is a schematic view of an adhesion device with a text highlighting baseline in an embodiment.

As shown in FIGS. 3A and 3B, the other plane of the adhesive material layer 2 adheres to an object 4 (e.g., book, paper, etc.) on which text contents 41 are presented, for example, the adhesive material layer 2 adheres to the object 4 with the highlighting baseline layer 3 getting close to the text contents 41. The text contents 41 are covered by but clearly seen through the substrate layer 1 when the substrate layer 1 and the adhesive material layer 2, both of which are made from materials with translucency or light permeability, are stuck to the object 4. The highlighting baseline layer 3 situated at the top or the bottom of the substrate layer 1 is used to highlight the text contents 41.

To clearly indicate the covered text contents 41, some translucent toners or pigments which colorize the substrate layer 1 and keep translucency or light permeability of the substrate layer 1 can be added into the substrate layer 1 as required.

Figure 4:
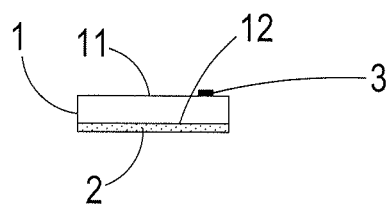
FIG. 4 is a schematic sectional view of an adhesion device with a text highlighting baseline in another embodiment.
Figure 5:
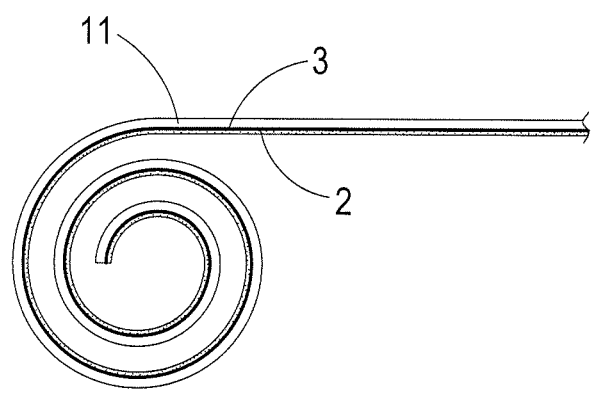
FIG. 5 is a structural schematic view of an adhesion device with a text highlighting baseline in another embodiment.

As shown in FIG. 4, the highlighting baseline layer 3, which was embedded between the second surface 12 of the substrate layer 1 and the adhesive material layer 2 in the previous embodiment, is placed on the first surface 11 of the substrate layer 1 and gets close to a top or bottom edge of the substrate layer 1 in another embodiment. Moreover, an adhesion device with a text highlighting baseline which is designed as a curly structure as shown in a further embodiment in FIG. 5 is curled and similar to a rolled adhesive tape; the substrate layer 1 developed outward can be easily taken and used by a user.

The highlighting baseline layer 3 is printed and stuck to the first surface 11 or the second surface 12 of the substrate layer 1.

Figure 6:
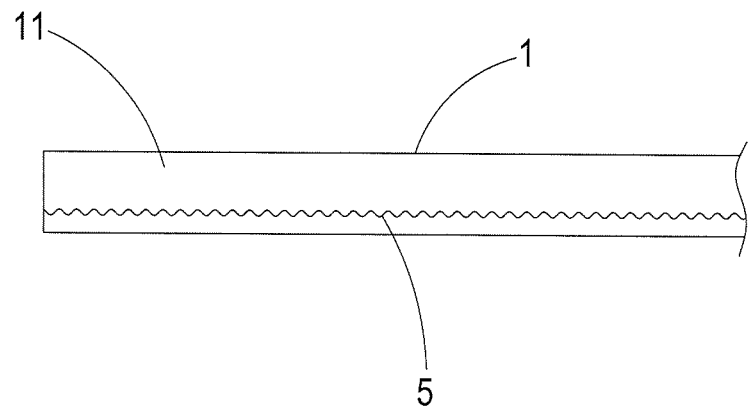
FIG. 6 is a schematic view which illustrates another highlighting baseline in an adhesion device with a text highlighting baseline.
Figure 7:
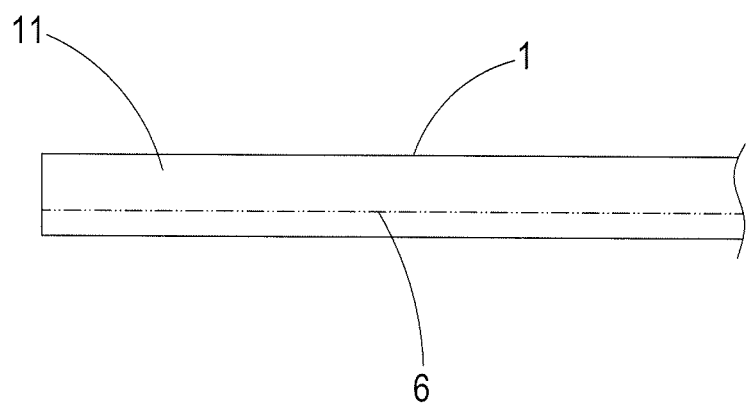
FIG. 7 is a schematic view which illustrates a further highlighting baseline in an adhesion device with a text highlighting baseline.
Figure 8:
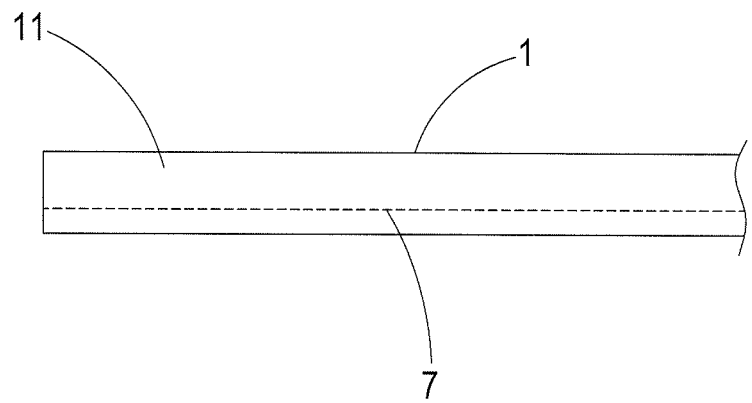
FIG. 8 is a schematic view which illustrates yet another highlighting baseline in an adhesion device with a text highlighting baseline.

As shown in FIG. 1, the highlighting baseline layer 3 is a solid line. In addition, a highlighting baseline layer 5 between the second surface 12 of the substrate layer 1 and the adhesive material layer 2 can be a wave line, as shown in FIG. 6; a highlighting baseline layer 6 between the second surface 12 of the substrate layer 1 and the adhesive material layer 2 can be a chain line, as shown in FIG. 7; a highlighting baseline layer 7 between the second surface 12 of the substrate layer 1 and the adhesive material layer 2 can be a dotted line, as shown in FIG. 7. In addition to a solid line, a wave line, a chain line and a dotted line, another type of line can be applied in a highlighting baseline layer 3.

An adhesion device with a text highlighting baseline can be repeatedly stuck to or stripped from an object when the adhesive material layer 2 is made from a material for reuses.

Figure 9:
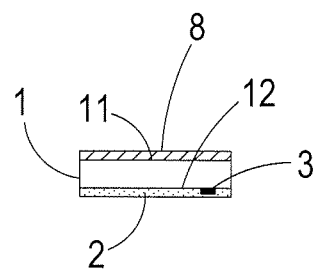
FIG. 9 is a structural schematic view of an adhesion device with a text highlighting baseline in another embodiment.
Figure 10:
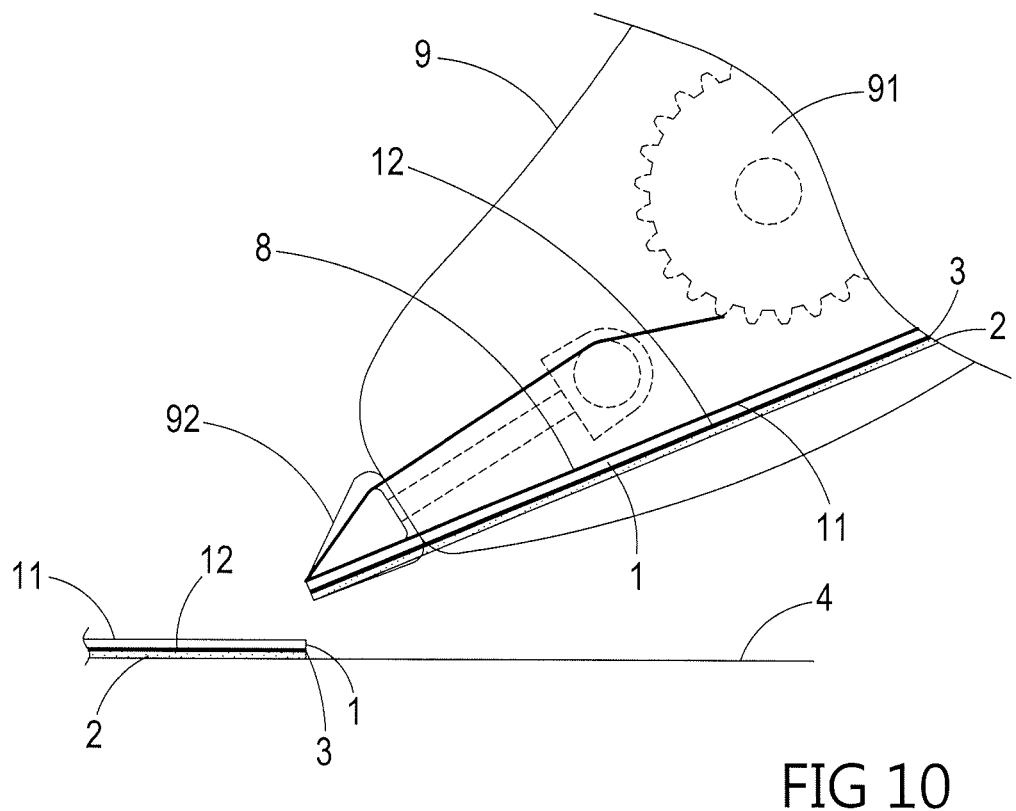
FIG. 10 is a schematic view of an adhesion device with a text highlighting baseline for the first example in another embodiment.

As shown in FIG. 9, a stripping layer 8 (made of plastic film or paper material) adheres to the second surface 11 of the substrate layer 1. In the embodiment, the stripping layer 8 can be stripped from the second surface 11 of the substrate layer 1 in which release agents are included. There are two examples in the embodiment and the first example is explained as follows. As shown in FIG. 10, the adhesion device slips out of an output device 9 when a toothed wheel 91 rolls. The stripping layer 8 on the top of the long-stripped adhesion device, which is placed at the bottom of the output device 9, has one end independently joining the toothed wheel 91; the adhesion device slips out of the output port 92 when the output device 9 slides on an inside page of the object 4 (book). With one end independently joining the toothed wheel 91, the stripping layer 8 on the adhesion device slipping out of the output port 92 is synchronously stripped from the second surface 11 of the substrate layer 1 and not left on the adhesion device adhering to an inside page of the object 4 (book) to which the adhesive material layer 2 is stuck. The text contents 41 are covered by but clearly seen through the substrate layer 1 when the substrate layer 1 and the adhesive material layer 2, both of which are made from materials with translucency or light permeability, adhere to the surface of the object 4. Moreover, the highlighting baseline layer 3 situated at the top or the bottom of the substrate layer 1 is used to highlight the text contents 41 for transfer print effect.

Figure 11:
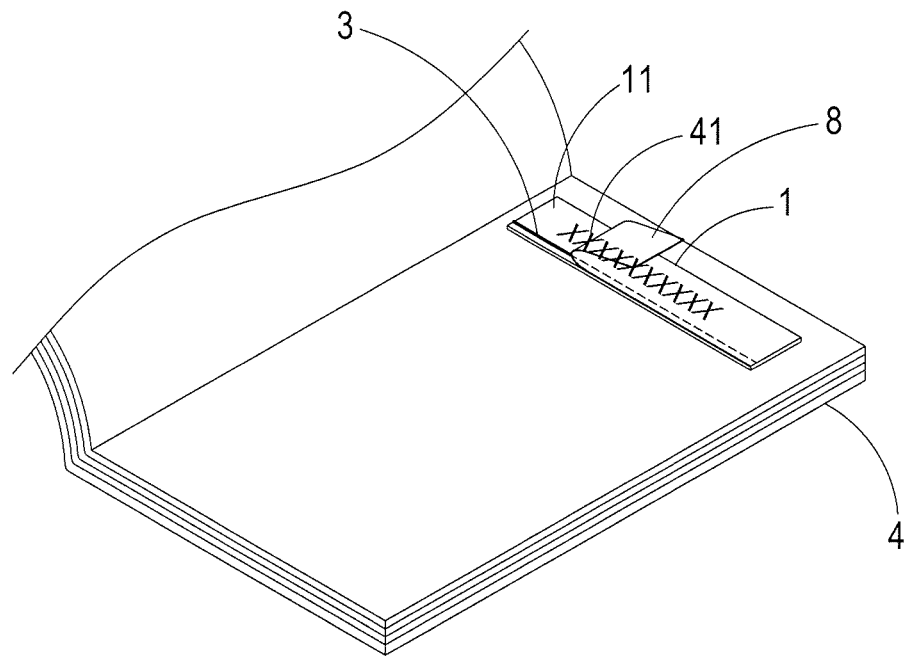
FIG. 11 is a schematic view of an adhesion device with a text highlighting baseline for the second example in another embodiment.

In addition to the first example, the adhesion device with the stripping layer 8 directly applied is shown in the second example in FIG. 11. When the adhesion device adheres to an inside page of the object 4 (book), the adhesion device with the stripping layer 8 applied is stuck to the text contents 41 of the object 4 because of viscosity of the adhesive material layer 2. To expose the highlighting baseline layer 3 which is covered by the stripping layer 8 and highlight key words or sentences, a user should manually remove the stripping layer 8 from the second surface 11 of the substrate layer 1.

In contrast to other devices based on conventional techniques, an adhesion device with a text highlighting baseline herein has advantages as follows:

1. An adhesion device with a text highlighting baseline adheres to and highlights text contents on an object effectively.
2. An adhesion device, which highlights or marks an object's text contents on an adhesion basis, keeps the object clean and repeatedly used without filth induced by a fluorescent marker pen or a ball pen on the object.

The preferred embodiments hereof should not be taken as examples to restrict the scope of an adhesion device with a text highlighting baseline in the present disclosure. The equivalent changes and modifications made by the skilled person who familiarizes himself with the above technical features and embodiments without departing from the spirit and scope of the present disclosure should be covered in claims of the patent specification.

What is claimed is:

1. An adhesion device with a text highlighting baseline, comprising:
   a substrate layer which features light permeability and has a first surface and a second surface;
   an adhesive material layer which features light permeability and has two planes, one plane contacting either the first surface or the second surface of the substrate layer and the other plane adhering to an object on which text contents are printed; and
   a highlighting baseline layer embedded between the substrate layer and the adhesive material layer and keeping a short distance from the substrate layer's edge by a margin,
   wherein the margin from the highlighting baseline layer to the edge of the substrate layer is less than 7 mm.

2. An adhesion device with a text highlighting baseline, comprising:
   a substrate layer which features light permeability and has a first surface and a second surface;
   an adhesive material layer which features light permeability and has two planes, one plane contacting either the first surface or the second surface of the substrate layer and the other plane adhering to an object on which text contents are printed; and
   a highlighting baseline layer situated at the other plane of the adhesive material layer to which no substrate layer is stuck and keeping a short distance from the substrate layer's edge by a margin,
   wherein the margin from the highlighting baseline layer to the edge of the substrate layer is less than 7 mm.

3. An adhesion device with a text highlighting baseline according to claim 2 wherein the highlighting baseline layer presents a solid line, a dotted line, a chain line or a wave line.

4. An adhesion device with a text highlighting baseline according to claim 3 wherein the highlighting baseline layer is less than 5 mm in width.

5. An adhesion device with a text highlighting baseline according to claim 3 wherein the substrate layer is colored and features light permeability.

\* \* \* \* \*